United States Patent
Barsness et al.

(10) Patent No.: US 10,678,422 B2
(45) Date of Patent: Jun. 9, 2020

(54) AUTOMATIC GENERATION OF A CLIENT PRESSURE PROFILE FOR A TOUCH SCREEN DEVICE

(71) Applicant: International Business Machines Corporation, Armonk, NY (US)

(72) Inventors: Eric L. Barsness, Pine Island, MN (US); Jay S. Bryant, Rochester, MN (US); James E. Carey, Rochester, MN (US); Joseph W. Cropper, Rochester, MN (US); John M. Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 616 days.

(21) Appl. No.: 15/457,594

(22) Filed: Mar. 13, 2017

(65) Prior Publication Data

US 2018/0260093 A1    Sep. 13, 2018

(51) Int. Cl.
*G06F 3/0488* (2013.01)
*G06F 3/041* (2006.01)

(52) U.S. Cl.
CPC .......... *G06F 3/0488* (2013.01); *G06F 3/0416* (2013.01); *G06F 3/0418* (2013.01); *G06F 3/04883* (2013.01); *G06F 2203/04105* (2013.01); *G06F 2203/04803* (2013.01)

(58) Field of Classification Search
CPC .... G06F 3/0483; G06F 3/0482; G06F 3/0481; G06F 17/30867; G06F 17/3089; G06F 3/04817; G06F 3/0488; G06F 3/0416; G06F 3/04883; G06Q 30/02
See application file for complete search history.

(56) References Cited

U.S. PATENT DOCUMENTS

| | | | |
|---|---|---|---|
| 7,000,116 B2 | 2/2006 | Bates et al. | |
| 8,519,971 B1 | 8/2013 | Mackraz | |
| 8,743,076 B1 | 6/2014 | Ludwig | |
| 9,329,767 B1 * | 5/2016 | Teller | G02B 27/017 |
| 9,400,548 B2 * | 7/2016 | Zhang | A63F 13/06 |

(Continued)

FOREIGN PATENT DOCUMENTS

KR    101577277 B1    12/2015

OTHER PUBLICATIONS

Barsness et al., "Pressure-Sensitive Touch Screen Display and Method", U.S. Appl. No. 15/277,121, filed Sep. 27, 2016.
(Continued)

*Primary Examiner* — Ryan Barrett
*Assistant Examiner* — Erik V Stitt
(74) *Attorney, Agent, or Firm* — Martin & Associates, LLC; Derek P. Martin

(57) ABSTRACT

A web server includes a client pressure profile sharing and generation mechanism that detects when a user accesses the web server with a first device that does not have a client pressure profile, and automatically generates a client pressure profile for the first device from a client pressure profile for a second device used by the user. Adjustments may be automatically made to the client pressure profile for the first device based on differences in orientation and based on differences in screen size. Changes by the user to the client pressure profile for the first device can be automatically propagated to client pressure profiles for other devices used by the user.

13 Claims, 13 Drawing Sheets

(56) References Cited

U.S. PATENT DOCUMENTS

| | | | |
|---|---|---|---|
| 9,405,391 B1 | 8/2016 | Mackraz | |
| 9,405,400 B1 | 8/2016 | Khafizov et al. | |
| 2002/0005108 A1 | 1/2002 | Ludwig | |
| 2006/0132456 A1* | 6/2006 | Anson | G06F 3/0488 345/173 |
| 2008/0218196 A1 | 9/2008 | Eckhart | |
| 2008/0289885 A1* | 11/2008 | Elwell | G06F 3/0414 178/18.01 |
| 2009/0195497 A1* | 8/2009 | Fitzgerald | G06F 1/3203 345/156 |
| 2010/0048167 A1 | 2/2010 | Chow et al. | |
| 2010/0123686 A1 | 5/2010 | Klinghult et al. | |
| 2012/0105367 A1 | 5/2012 | Son et al. | |
| 2013/0002538 A1* | 1/2013 | Mooring | G06F 1/163 345/156 |
| 2013/0169434 A1 | 7/2013 | McCown et al. | |
| 2013/0257777 A1* | 10/2013 | Benko | G06F 3/03545 345/173 |
| 2014/0187200 A1 | 7/2014 | Reitter et al. | |
| 2014/0208248 A1 | 7/2014 | Davidson | |
| 2014/0229848 A1 | 8/2014 | Zhang et al. | |
| 2014/0247222 A1 | 9/2014 | Ferren | |
| 2014/0310103 A1* | 10/2014 | Ricci | H04W 4/40 705/14.62 |
| 2015/0084873 A1 | 3/2015 | Hagenbuch et al. | |
| 2015/0091858 A1 | 4/2015 | Rosenberg et al. | |
| 2015/0229991 A1* | 8/2015 | Cordray | G06F 3/0482 725/10 |
| 2015/0301671 A1* | 10/2015 | Fan | G06F 3/0414 715/762 |
| 2016/0188181 A1 | 6/2016 | Smith | |
| 2016/0164865 A1 | 7/2016 | Speicher et al. | |
| 2016/0364010 A1 | 12/2016 | Amma et al. | |
| 2016/0378255 A1 | 12/2016 | Butler et al. | |
| 2017/0024074 A1 | 1/2017 | Forlines et al. | |
| 2017/0242539 A1 | 8/2017 | Mani | |

OTHER PUBLICATIONS

Barsness et al., "Pressure-Sensitive Touch Screen Display and Method", U.S. Appl. No. 15/339,370, filed Oct. 31, 2016.

Barsness et al., "Web Server That Renders a Web Page Based on a Client Pressure Profile", U.S. Appl. No. 15/339,455, filed Oct. 31, 2016.

Barsness et al., "Pressure-Sensitive Touch Screen Display and Method", U.S. Appl. No. 15/633,503, filed Jun. 26, 2017.

Barsness et al., "Pressure-Sensitive Touch Screen Display and Method", U.S. Appl. No. 15/693,412, filed Aug. 31, 2017.

Barsness et al., "Pressure-Sensitive Touch Screen Display and Method", U.S. Appl. No. 15/693,434, filed Aug. 31, 2017.

Appendix P—List of IBM Patents or Patent Applications Treated as Related, dated Sep. 27, 2017.

Appendix P—List of IBM Patents or Patent Applications Treated as Related, dated Jul. 15, 2017.

Appendix P—List of IBM Patents or Patent Applications Treated as Related, dated May 17, 2017.

Barsness et al., "Web Server That Renders a Web Page Based on a Client Pressure Profile", U.S. Appl. No. 15/887,113, filed Feb. 2, 2018.

IBM, Appendix P—List of IBM Patents or Patent Applications Treated as Related, dated Mar. 2, 2018.

Barsness et al., "Pressure-Sensitive Touch Screen Display and Method", U.S. Appl. No. 15/812,146, filed Nov. 14, 2017.

Barsness et al., "Pressure-Sensitive Touch Screen Display and Method", U.S. Appl. No. 15/813,130, filed Nov. 14, 2017.

IBM, Appendix P—List of IBM Patents or Patent Applications Treated as Related, dated Jan. 31, 2018.

* cited by examiner

| | Small Contact Area (Stylus) | Medium Contact Area (Finger) | Large Contact Area (Thumb) |
|---|---|---|---|
| Section 1-1 Pressure A | P1 | P1' | P1'' |
| Section 1-1 Pressure B | P2 | P2' | P2'' |
| Section 1-1 Pressure C | P3 | P3' | P3'' |
| Section 1-2 Pressure A | P4 | P4' | P4'' |
| ⋮ | ⋮ | ⋮ | ⋮ |
| Section N-M Pressure X | PY | PY' | PY'' |

US 10,678,422 B2

AUTOMATIC GENERATION OF A CLIENT PRESSURE PROFILE FOR A TOUCH SCREEN DEVICE

BACKGROUND

1. Technical Field

This disclosure generally relates to electronic devices with touch screen displays, and more specifically relates to devices with a pressure-sensitive touch screen display.

2. Background Art

Users interact with electronic devices that have touch screen displays, such as smart phones, in different ways. Most people use their fingers or thumbs most of the time, while some use a stylus. Apple, Inc. introduced a touch screen display in the Apple 6 phones that is pressure-sensitive, meaning a light touch on a pressure-sensitive graphic can cause a first action, a medium touch can cause a second action, and a heavy touch can cause a third action. This pressure-sensitive touch screen display is supported in the iOS 9 and iOS 10 by Apple that runs on Apple devices, and is called 3D Touch by Apple. 3D Touch is a trademark of Apple, Inc.

Different users use their devices in different manners. For example, some prefer to hold their phone in a portrait orientation, and scroll or select items on the screen with the thumb of the hand that is holding the phone. Some prefer to hold their phone in a landscape orientation, and scroll and select items on the screen with the thumbs of both hands. Two-handed operation is often preferred for typing text, such as when texting someone. Some prefer to use fingers instead of thumbs. People also use their devices in different orientations depending on the application they are using.

The different ways people use their devices may make using a pressure-sensitive touch screen somewhat difficult for some users. What a user intends to be a light touch could be interpreted as a medium touch. The orientation of the device comes into play, because a user holding a phone in portrait orientation in her right hand would likely produce different amounts of pressure depending on the location on the screen being touched. Thus, the user holding the phone in her right hand might touch an item close to the right edge with much less force than when touching an item in the middle or on the left edge of the screen. This is due to the anatomical features of a person's hands. Thus, a user may touch an item on the right side of the screen intending a medium touch, but the device recognizes the touch as a light touch, which is not what the user intended.

SUMMARY

A web server includes a client pressure profile sharing and generation mechanism that detects when a user accesses the web server with a first device that does not have a client pressure profile, and automatically generates a client pressure profile for the first device from a client pressure profile for a second device used by the user. Adjustments may be automatically made to the client pressure profile for the first device based on differences in orientation and based on differences in screen size. Changes by the user to the client pressure profile for the first device can be automatically propagated to client pressure profiles for other devices used by the user.

The foregoing and other features and advantages will be apparent from the following more particular description, as illustrated in the accompanying drawings.

BRIEF DESCRIPTION OF THE DRAWING(S)

The disclosure will be described in conjunction with the appended drawings, where like designations denote like elements, and:

DETAILED DESCRIPTION

A web server includes a client pressure profile sharing and generation mechanism that detects when a user accesses the web server with a first device that does not have a client pressure profile, and automatically generates a client pressure profile for the first device from a client pressure profile for a second device used by the user. Adjustments may be automatically made to the client pressure profile for the first device based on differences in orientation and based on differences in screen size. Changes by the user to the client pressure profile for the first device can be automatically propagated to client pressure profiles for other devices used by the user.

Figure 1:
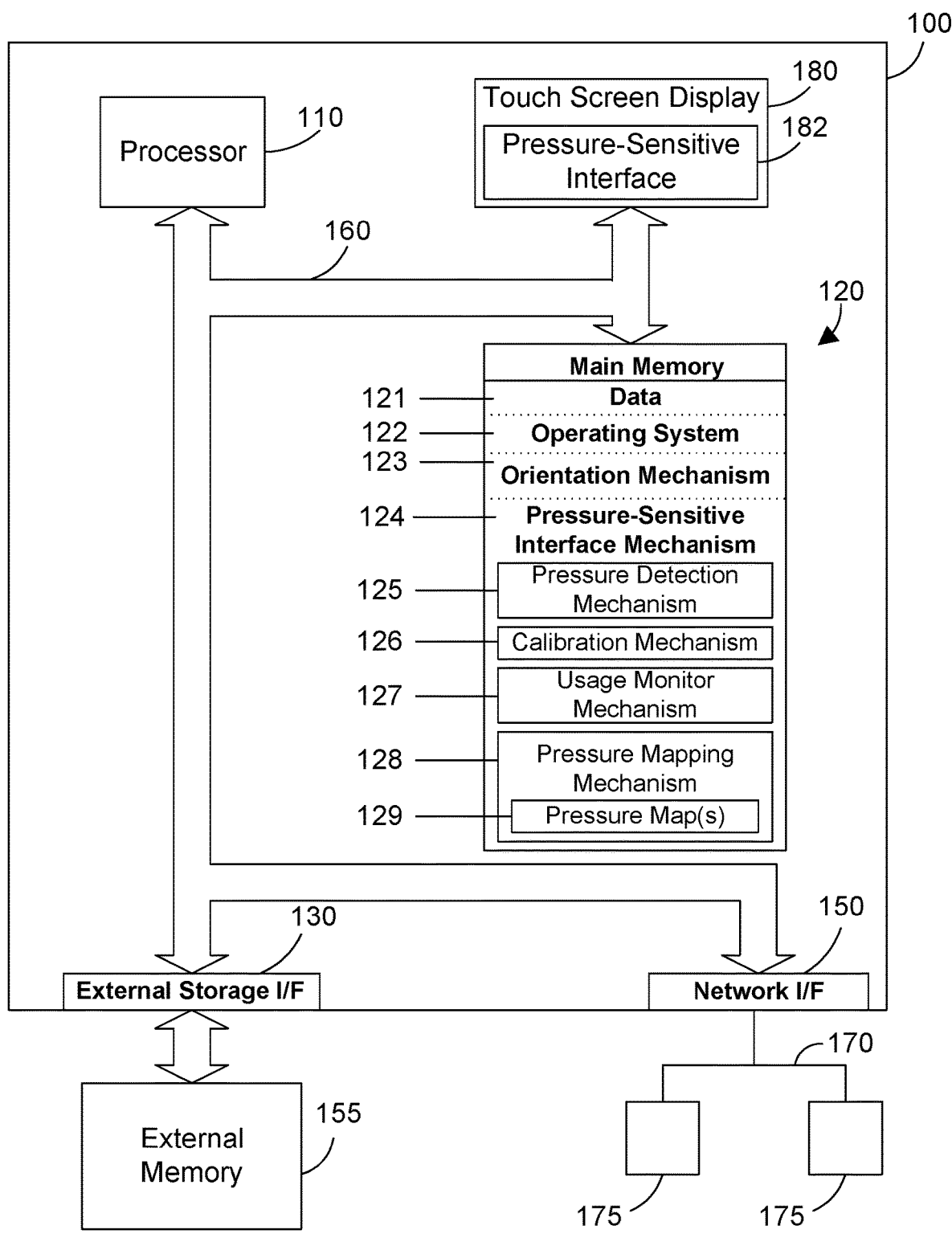
FIG. 1 is a block diagram of an electronic device that includes a pressure-sensitive touch screen display.

Referring to FIG. 1, a device 100 represents any suitable type of electronic device, including without limitation a smart phone, tablet computer, electronic book reader, notebook computer, laptop computer, gaming console, smart watch, etc. Those skilled in the art will appreciate that the disclosure herein applies equally to any type of electronic device. As shown in FIG. 1, a device 100 comprises one or more processors 110, a main memory 120, an external storage interface 130, a network interface 150, and a touch screen display 180. These system components are interconnected through the use of a system bus 160. External storage interface 130 is used to access external memory. One specific type of external memory 155 is non-volatile memory on an external device, such as an SD card, a micro-SD card, or a thumb drive.

Main memory 120 preferably contains data 121, an operating system 122, an orientation mechanism 123, and a pressure-sensitive interface mechanism 124. Data 121 represents any data that serves as input to or output from any program in device 100. Operating system 122 could be any suitable operating system for an electronic device. Known operating systems for electronic devices include the iOS operating system developed by Apple, Inc., the Android operating system developed by Google, and the Windows operating system developed by Microsoft.

The orientation mechanism 123 allows the device 100 to determine its physical orientation in space. Known devices include one or more accelerometers that communicate with an orientation mechanism 123 and thus allow determining the device's physical orientation in space, meaning both physical location and angle or direction of the device at that physical location. One such use of a device's orientation mechanism 123 is to rotate the screen when the orientation of the screen is moved by a user from portrait to landscape position, and vice versa. Orientation mechanism 123 is well-known in the art of electronic devices, and therefore is not discussed in more detail here.

Touch screen display 180 is a display that allows the user to select functions on the device 100 by touching displayed items on the touch screen display 180. The touch screen display 180 includes a pressure-sensitive interface 182. The pressure-sensitive interface 182 allows the touch screen display 180 to detect multiple pressure levels for a user selection on the touch screen. Any suitable number of pressure levels could be detected by the pressure-sensitive interface 182. In one suitable example, the pressure-sensitive interface 182 can distinguish between three different pressure levels, denoted herein as a light touch, a medium touch, and a heavy touch. Of course, any suitable number of pressure levels could be detected by the pressure-sensitive interface 182 within the scope of the disclosure and claims herein.

Note that all touch screens that detect pressure are "pressure-sensitive" in a general sense, because they necessarily must distinguish between no touch or a very light touch, which corresponds to no action, and a touch with sufficient pressure to select an item on the display. However, not all touch screens are pressure-sensitive as discussed herein. As used in this disclosure, a "pressure-sensitive" touch screen display is capable of detecting a plurality of pressures when a user touches a displayed item on the touch screen display, and interpreting each of the plurality of pressures as a different action with respect to the displayed item. Thus, if a pressure-sensitive touch screen display has three different pressure thresholds, the user can perform different functions on a displayed item depending on whether the user performs a light tap, a medium tap, or a heavy tap.

The pressure-sensitive interface mechanism 124 is software that interacts with the pressure-sensitive interface 182 on the touch screen display 180 to detect the pressure applied to the pressure-sensitive interface, and to perform one or more actions based on the detected pressure. The pressure-sensitive interface mechanism 124 includes a pressure detection mechanism 125, a calibration mechanism 126, a usage monitor mechanism 127, and a pressure mapping mechanism 128. The pressure detection mechanism 125 interacts with the pressure-sensitive interface 182 to determine the pressure applied when a user selects an item displayed on the touch screen display 180. The calibration mechanism 126 is an optional mechanism that allows calibrating the pressure-sensitive interface mechanism 124 for a particular user. The usage monitor mechanism 127 monitors how a user uses the device 100, and allows the pressure-sensitive interface mechanism 124 to dynamically make changes based on the monitored usage. The pressure mapping mechanism 128 creates one or more pressure maps 129 that include multiple pressure thresholds for different sections or regions of the touch screen display 180, as described in more detail below. In addition, each pressure map may define one or more preferred screen regions and one or more less preferred screen regions.

Main memory 120 may include any suitable combination of different memory types. For example, main memory 120 could include dynamic random access memory (DRAM) that has a relatively small size and a fast access time and could also include non-volatile memory (NVRAM) that has a much larger size and a slower access time. Programs stored in NVRAM could then be loaded into the DRAM in order to be executed by the processor 110. This simple example shows the main memory 120 can include any suitable number and type of memories in any suitable hierarchy, whether currently known or developed in the future.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up operating system 122. Processor 110 also executes the orientation mechanism 123 and pressure-sensitive interface mechanism 124 under the control of the operating system 122.

Although device 100 is shown to contain only a single processor and a single system bus, those skilled in the art will appreciate that a pressure-sensitive interface mechanism may be practiced using a device that has multiple processors and/or multiple buses. In addition, the interfaces that are used preferably each include separate, fully programmed microprocessors that are used to off-load compute-intensive processing from processor 110. However, those skilled in the art will appreciate that these functions may be performed using I/O adapters as well.

Network interface 150 is used to connect device 100 to a network 170. Network interface 150 broadly represents any suitable way to interconnect electronic devices, such as device 100, to other devices 175, regardless of whether the network 170 comprises present-day analog and/or digital techniques or via some networking mechanism of the future.

Network interface 150 preferably includes a combination of hardware and software that allow communicating on the network 170. The network interface 150 can include multiple different network interfaces. For example, network interface 150 could include a wireless interface for communicating with a 4G network, a WiFi interface for communicating with a WiFi network, and a Bluetooth interface for communicating with other devices via Bluetooth. Many different network protocols can be used to implement a network. These protocols are specialized computer programs that allow computers to communicate across a network. TCP/IP (Transmission Control Protocol/Internet Protocol) is an example of a suitable network protocol that may be used by the communication manager within the network interface 150.

Figure 2:
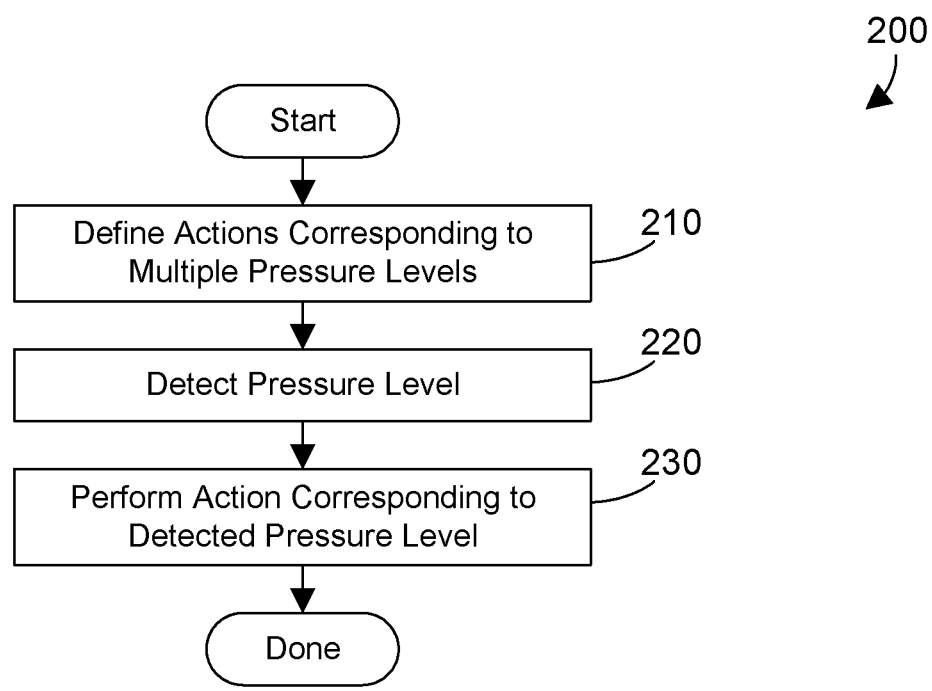
FIG. 2 is a flow diagram of a method for detecting a user's actions on a pressure-sensitive touch screen display.

Referring to FIG. 2, a method 200 is representative of the function of the 3D Touch interface by Apple, Inc. Method 200 assumes a touch screen with pressure-sensitive interface is part of the device. Actions corresponding to multiple pressure levels are defined (step 210). A pressure level is detected (step 220), and an action corresponding to a detected pressure level is performed (step 230). Note that method 200 defines actions that correspond to multiple pressure levels in step 210, but each of these multiple pressure levels is the same across the entire touch screen display. Thus, a light touch is defined by the touch screen display as being a touch anywhere on the touch screen display that is less than a first pressure detection threshold. A medium touch is defined as being a touch anywhere on the touch screen display that is greater than the first pressure detection threshold but less than a second pressure detection threshold. A heavy touch is defined as being a touch anywhere on the touch screen display that is greater than the second pressure detection threshold. The pressure detection thresholds are thus the same across the entire surface of the touch screen display. As discussed in the Background section above, a user may apply different pressures to different portions of the screen based on the orientation of the device and whether the user uses a stylus, finger or thumb to select an item on the touch screen display. Thus, a user may have to concentrate on applying the correct amount of pressure in different regions of the screen.

Figure 3:
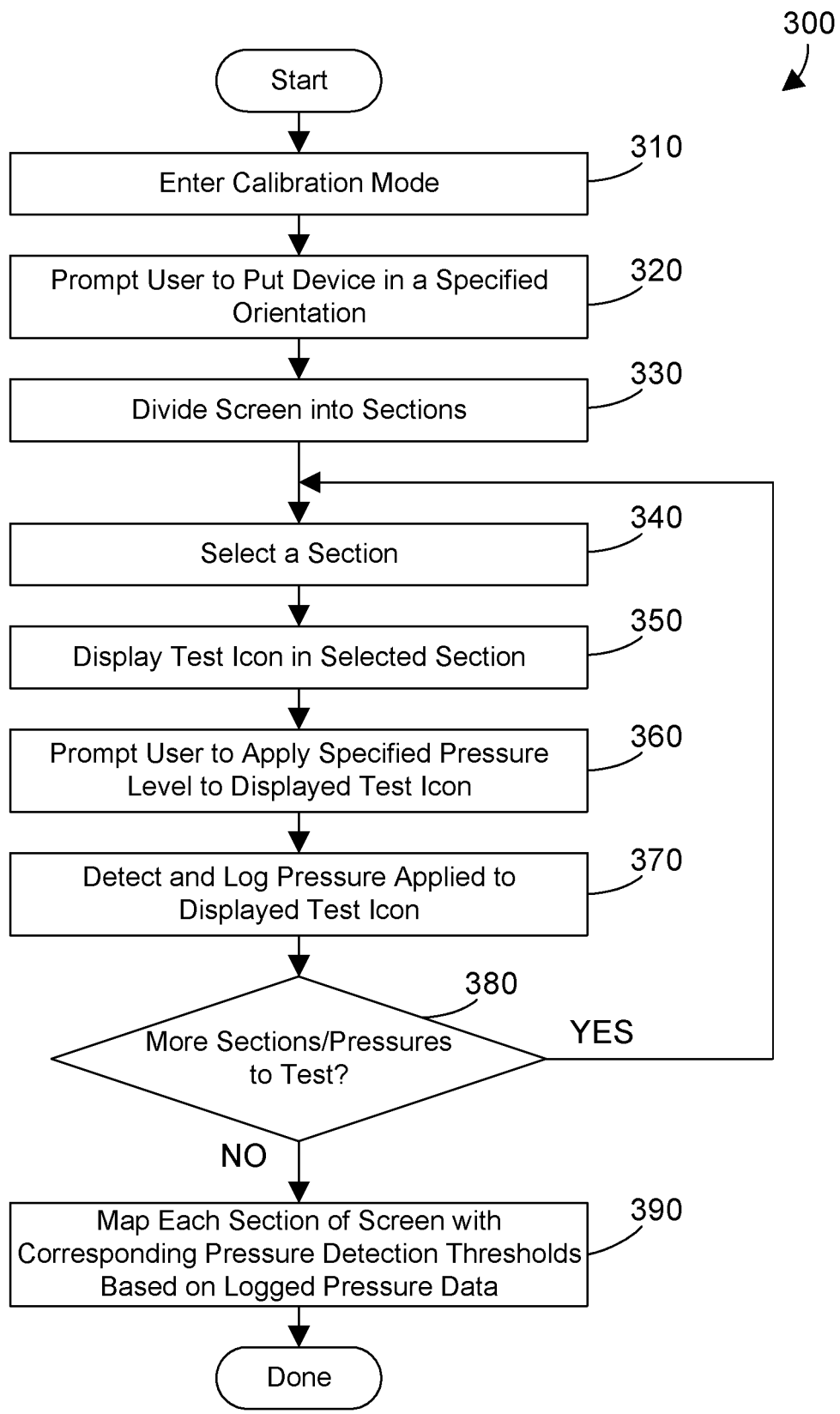
FIG. 3 is a flow diagram of a method for creating a pressure map of a pressure-sensitive touch screen display based on a user's use of the device in a calibration mode.

The electronic device disclosure herein reduces the issues that arise from users applying different pressures to different areas of a touch screen display while intending to apply similar pressure. Referring to FIG. 3, a method 300 is preferably performed by the pressure-sensitive interface mechanism 124 shown in FIG. 1. Method 300 begins by entering a calibration mode (step 310). The calibration mode, represented by steps 320-390 in FIG. 3, are preferably performed under control of the calibration mechanism 126 shown in FIG. 1. The user is prompted to put the device in a specified orientation (step 320). Examples of specified orientation include portrait mode where the longest portion of the device is running up and down, and landscape mode where the longest portion of the device is running side to side. Of course, other orientations are also possible, such as any suitable position between portrait mode and landscape mode. In addition, the orientations may include the angle at which the user holds the device. In the most preferred implementation, when the user is prompted in step 320 to place the device in portrait orientation, for example, the user will hold the device in portrait orientation at the angle the user prefers. Note that once the user is prompted to put the device in a specified orientation, method 300 then proceeds to step 330 once the orientation mechanism 123 in FIG. 1 detects the device is in the specified orientation.

With the device in the specified orientation, the screen on the touch screen display is then divided into sections (step 330). Any suitable geometrical shape of sections could be used, including squares, triangles, rectangles, polygons, etc. In the most preferred implementation, the screen is divided up into a grid of square or rectangular sections in step 330. A section is selected (step 340). A test icon is displayed in the selected section (step 350). The user is then prompted to apply a specified pressure level to the displayed test icon (step 360). Examples of specified pressure levels could include light, medium and heavy. However, the disclosure and claims herein extend to any suitable number of pressure levels. The user then applies the specified pressure level to the test icon, and the pressure is detected and logged (step 370) by the pressure detection mechanism 125 shown in FIG. 1. When there are more sections or pressures to test (step 380=YES), method 300 loops back to step 340 and continues. In the example where there are three different pressure levels, light, medium and heavy, a section will be selected in step 340, the user is prompted to apply light pressure to the displayed test icon in step 360, the pressure is detected and logged in step 370, then method 300 loops back and repeats steps 340-380 while prompting the user to apply medium pressure, then method 300 loops back and repeats steps 340-380 while prompting the user to apply heavy pressure. Method 300 then loops back and selects the next section to test, and repeats the three-pass process to log the three pressure levels for the next section, and so on. In the most preferred implementation, the calibration mode logs all defined pressure levels for all sections of the touch screen display during the calibration mode. Note, however, that less than all the defined pressures in less than all the defined sections could also be tested and logged in calibration mode. When there are no more sections or pressures to test (step 380=NO), a pressure map is created that maps each section of the screen with corresponding pressure detection thresholds based on the logged pressure data (step 390). The creation of the pressure map in step 390 is preferably performed by the pressure mapping mechanism 128 creating one or more pressure maps 129 shown in FIG. 1. Method 300 is then done.

Figure 4:
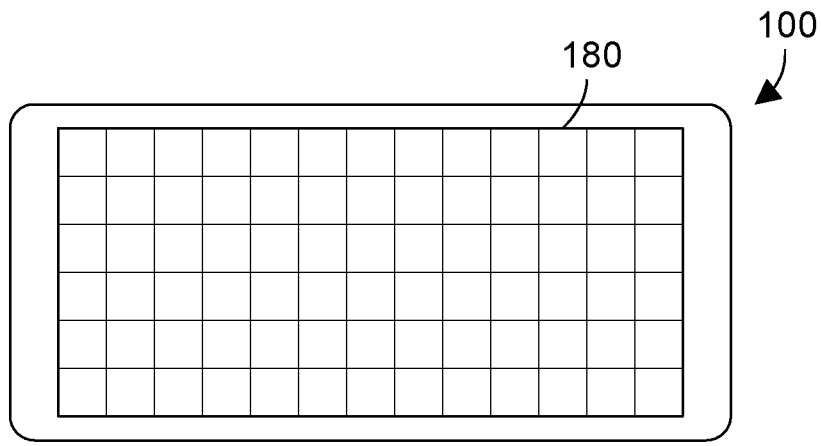
FIG. 4 is a diagram showing a device in landscape orientation with the touch screen display divided into multiple sections.

The steps in method 300 in FIG. 3 could be repeated for each orientation of the device. This would result in multiple sections of the touch screen display that have a first set of pressure thresholds in one orientation, and a second set of pressure thresholds in a different orientation. Of course, the number and shape of the sections could vary between the different variations. Thus, a landscape orientation as shown in FIG. 4 could have a grid of squares as shown, while a portrait orientation could have an array of much larger hexagons. Any suitable combination of orientations, section size, and section shape may be used within the scope of the disclosure and claims herein.

FIG. 4 shows one suitable example of an electronic device 100 with a touch screen display 180 that is divided into sections, as discussed in step 330 in FIG. 3. Each section is represented by a square in the grid shown in FIG. 4. In the most preferred implementation, each section of the touch screen display could have its own pressure detection thresholds. However, it is equally within the scope of the disclosure and claims herein to have multiple sections of the touch screen display share common pressure detection thresholds. In addition, the shape and number of sections may vary within the scope of the disclosure and claims herein.

Figure 5:
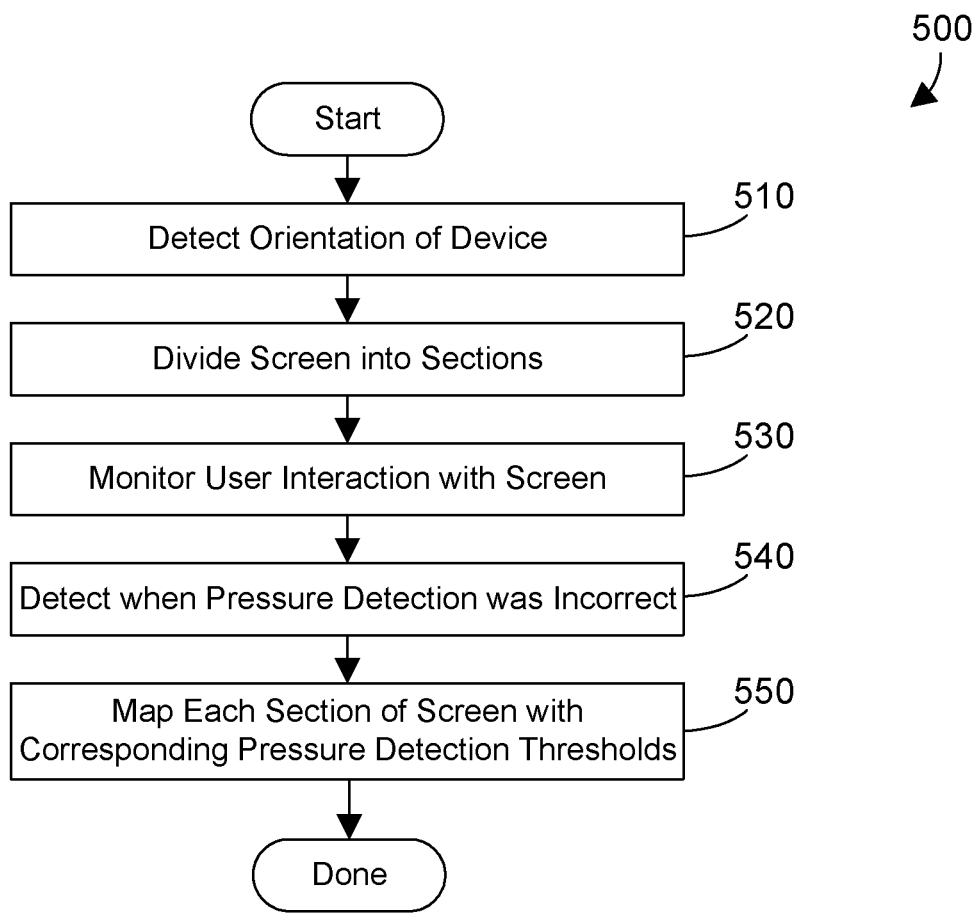
FIG. 5 is flow diagram of a method for creating or updating a pressure map of a pressure-sensitive touch screen display based on monitored user interaction with the pressure-sensitive touch screen display.

Referring to FIG. 5, a method 500 is preferably performed once the user is using the device day to day. The orientation of the device is detected (step 510). The screen is divided into sections (step 520). The user interaction with the screen is monitored (step 530). Monitoring the user interaction with the screen is preferably performed by the usage monitor mechanism 127 shown in FIG. 1. Next, detect when the pressure detection was incorrect (step 540). For example, when the user selects a pressure-sensitive item, then goes back or selects the item again with a different pressure, this is an indication the pressure detection was incorrect in the first instance. A pressure map is then created where each section of the screen is mapped with corresponding pressure detection thresholds (step 550). The pressure map is preferably created by the pressure mapping mechanism 128 shown in FIG. 1.

In a first preferred implementation, method 500 in FIG. 5 is performed after the calibration in method 300 in FIG. 3 is performed. In this case, the screen sections in step 520 will correspond to the screen sections defined in step 330. In other words, the calibration method 300 shown in FIG. 3 can initially define multiple pressure detection thresholds for multiple screen sections, then method 500 can continuously monitor the user's usage of the device and dynamically update any of the pressure detection thresholds for any of the screen sections, as needed.

In a second preferred implementation, method 500 in FIG. 5 is performed without performing the calibration in method 300 in FIG. 3. When this is the case, we assume each of the screen sections have the same multiple pressure detection thresholds to start. Then as the user's usage is monitored in method 500, one or more of these pressure detection thresholds is adjusted to better match the user's usage of the device.

Figure 6:
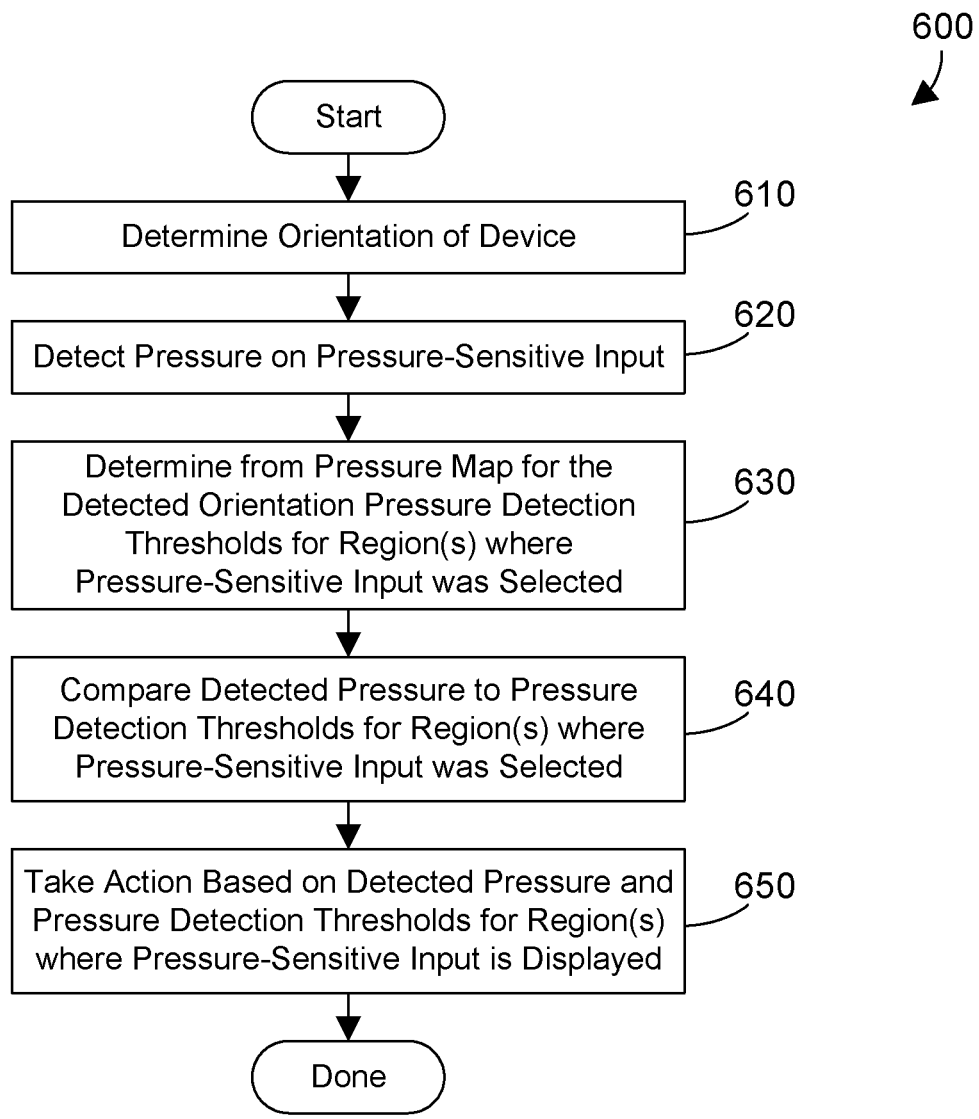
FIG. 6 is a flow diagram of a method for using pressure detection thresholds in the pressure map for one or more regions of the touch screen display when a pressure-sensitive input on the touch screen display is selected by the user.

Once one or more pressure maps are created, either in step 390 in FIG. 3 and/or in step 550 in FIG. 5, the user's actions on the touch screen display may then be interpreted according to the pressure map(s). Referring to FIG. 6, a method 600 is preferably performed by the pressure-sensitive interface mechanism 124 shown in FIG. 1. The orientation of the device is determined (step 610). The pressure by a user on a pressure-sensitive input displayed on the touch screen display is then detected (step 620). From the pressure map for the detected orientation, pressure detection thresholds for one or more regions where the pressure-sensitive input was selected are determined (step 630). Note the term "region" as used herein may include one or more sections of the touch screen display. For example, an icon selected by the user could span multiple sections of the touch screen display, which together comprise the region of the touch screen display touched by the user. The detected pressure is then compared to the pressure detection thresholds for the region(s) where the pressure-sensitive input was selected (step 640). Action is then taken based on the detected pressure and the applicable pressure detection thresholds (step 650). A simple example will illustrate. We assume the device is in a portrait orientation, which is detected in step 610. An icon is displayed on the touch screen display that is contained within a single section of the screen, which we arbitrarily name S5. Step 620 detects the pressure the user uses when the user touches the icon in section S5. Next, the pressure map for the portrait orientation is consulted in step 630 to determine the appropriate pressure detection thresholds for section S5 of the touch screen display. For this example, we assume a light touch is defined as a pressure less than P1, a medium touch is defined as a pressure between P1 and P2, and a heavy touch is defined as a pressure greater than P2. We now compare the detected pressure to these three pressure detection thresholds P1, P2 and P3 for section S5. For this simple example, we assume the detected pressure is between P1 and P2 in step 640, which corresponds to a medium touch. Action is then taken in step 650 based on the medium touch by the user. Note the example above is extremely simplified for the purpose of illustration. However, one skilled in the art will recognize that many different examples and variations are possible within the scope of the disclosure and claims herein.

Figures 7, 8:
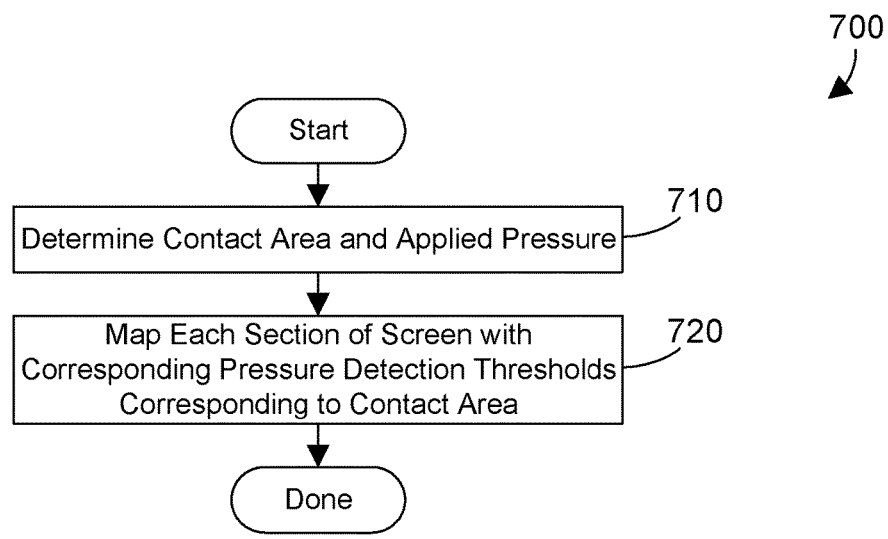
FIG. 7 is a flow diagram of a method for creating different pressure detection thresholds in a pressure map based on contact area.
FIG. 8 is a table showing examples of a pressure map that includes pressure detection thresholds that can vary depending on the detected contact area on the touch screen display.

In addition to detecting when a user selects a pressure-sensitive input on the touch screen display, it is also possible to detect how the user selected the pressure-sensitive input based on the contact area on the touch screen display. Referring to FIG. 7, method 700 is preferably performed by the pressure-sensitive interface mechanism 124 shown in FIG. 1. The contact area and applied pressure of a user selection is determined (step 710). Each section of the screen can then be mapped with corresponding pressure detection thresholds corresponding to the contact area (step 720). Method 700 is then done.

One specific example to illustrate the principles in method 700 is shown in the pressure maps shown in the table in FIG. 8. We assume a small contact area corresponds to when the user uses a stylus; a medium contact area corresponds to when the user uses a finger; and a large contact area corresponds to when the user uses a thumb. With these three different contact areas, it is now possible to define a pressure map that includes pressure detection thresholds for each of these contact areas. For the simple example shown in FIG. 8, we assume Section 1-1 defines a lower threshold Pressure A, a medium threshold Pressure B, and an upper threshold Pressure C. The values of these thresholds can vary according to contact area. Thus, Pressure A for Section 1-1 in FIG. 8 is P1 for the small contact area, P1' for the medium contact area, and P1" for the large contact area. In similar fashion, Pressures B and C for Section 1-1 each have corresponding pressures for the three different contact areas. Similarly, nine separate pressure detection thresholds could be defined for each of the other sections on the touch screen display as a function of contact area. The result is a pressure map that has a finer granularity due to taking contact area into account. Thus, the pressure a user applies using a stylus can be different than the pressure the user applies using a thumb while still providing the same functionality according to the user's usage of the device and the detected contact area.

Figure 9:
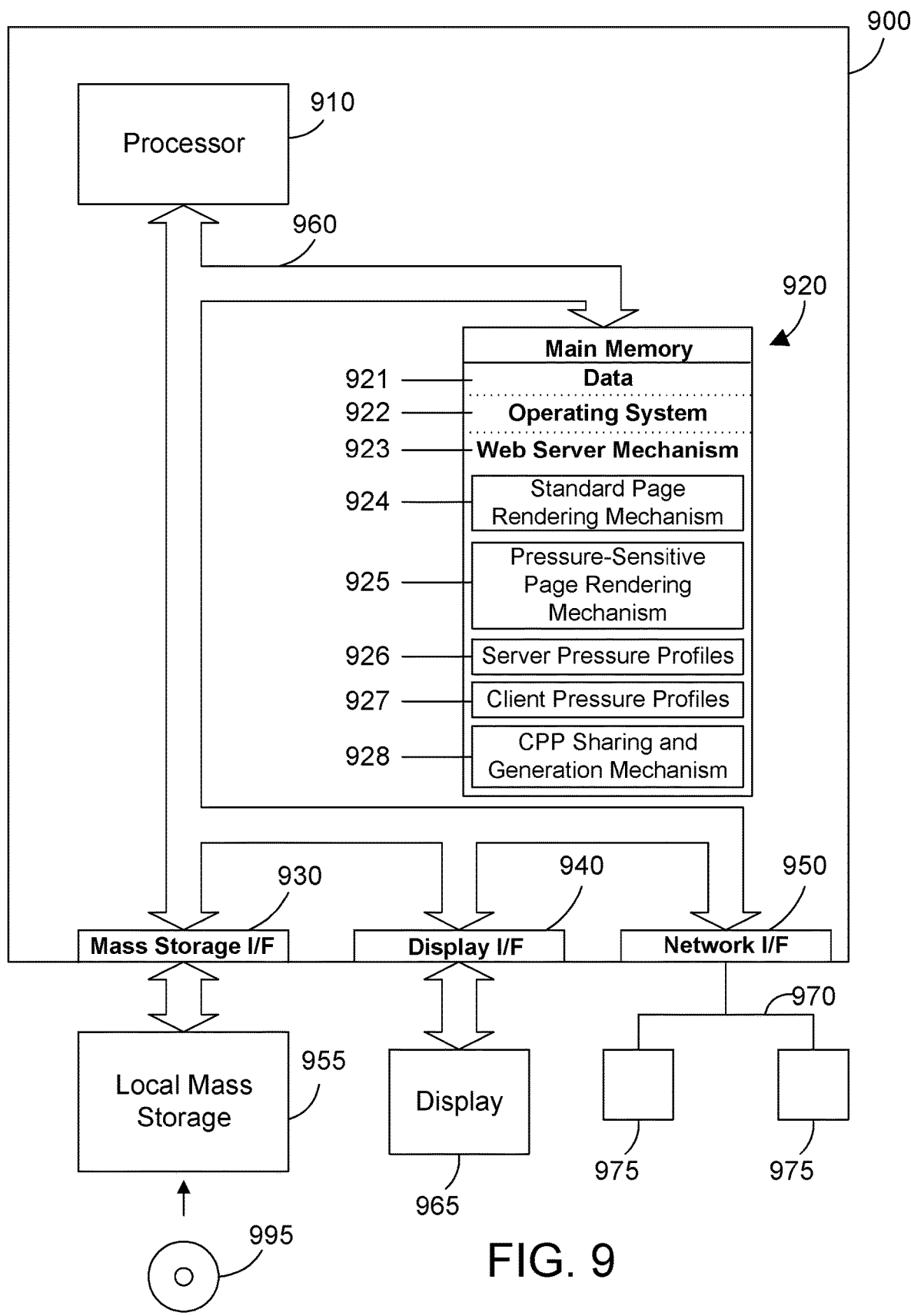
FIG. 9 is a block diagram of a web server computer system that includes a pressure-sensitive page rendering mechanism and a client pressure profile sharing and generation mechanism.

Referring to FIG. 9, a computer system 900 is one suitable implementation of a web server computer system that includes a pressure-sensitive page rendering mechanism and a client pressure profile sharing and generation mechanism as described in more detail below. Server computer system 900 is an IBM POWER8 computer system. However, those skilled in the art will appreciate that the disclosure herein applies equally to any computer system, regardless of whether the computer system is a complicated multi-user computing apparatus, a single user workstation, a laptop computer system, a tablet computer, a phone, or an embedded control system. As shown in FIG. 9, computer system 900 comprises one or more processors 910, a main memory 920, a mass storage interface 930, a display interface 940, and a network interface 950. These system components are interconnected through the use of a system bus 960. Mass storage interface 930 is used to connect mass storage devices, such as local mass storage device 955, to computer system 900. One specific type of local mass storage device 955 is a readable and writable CD-RW drive, which may store data to and read data from a CD-RW 995. Another suitable type of local mass storage device 955 is a card reader that receives a removable memory card, such as an SD card, and performs reads and writes to the removable memory. Yet another suitable type of local mass storage device 955 is a thumb drive.

Main memory 920 preferably contains data 921, an operating system 922, and a web server mechanism 923. Data 921 represents any data that serves as input to or output from any program in computer system 900. Operating system 922 is a multitasking operating system, such as AIX or LINUX. The web server mechanism 923 is software that receives requests for web pages from client devices, and in response, renders web pages to the client devices. The web server mechanism 923 includes a standard page rendering mechanism 924, a pressure-sensitive page rendering mechanism 925, server pressure profiles 926, one or more client pressure profiles 927, and a client pressure profile sharing and generation mechanism 928. The standard page rendering mechanism 924 represents a page rendering mechanism as known in the art. The standard page rendering mechanism 924 can render web pages to a requesting device. For example, the standard page rendering mechanism 924 may render a first version of a page to a user's laptop computer system, but when the user is using a mobile device such as a smart phone, the standard page rendering mechanism 924 renders a different version of the page to the user's smart phone. It is known in the art to provide both non-mobile versions of web pages and mobile versions of web pages, because the smaller screens on mobile devices create an environment where displaying the same page designed for a large display will not work well on a small display, because the text will be difficult to read and the selectable items like icons and links will be too small to easily select with the tip of a finger or thumb.

The pressure-sensitive page rendering mechanism 925 is software that renders web pages to devices that have a pressure-sensitive touch screen display. In the prior art, web servers render the same page to devices that have a pressure-sensitive touch screen display as devices that don't. Thus, when a user with a smart phone requests a web page, known web servers render the mobile version of the page, without knowing or caring whether or not the device has a pressure-sensitive touch screen display. The pressure-sensitive page rendering mechanism 925 determines when a requesting device has a pressure-sensitive touch screen display, and renders pages to devices that have a pressure-sensitive touch screen display. Thus, when a user of a smart phone without a pressure-sensitive touch screen display requests a web page from the web server 900, the standard page rendering mechanism 924 will return the standard mobile version of the requested web page to the user's smart phone. In contrast, when a user of a smart phone with a pressure-sensitive touch screen display requests a web page from the web server 900, the pressure-sensitive page rendering mechanism 925 renders a page that is better suited to the pressure-sensitive touch screen display, as discussed in more detail below.

The web server may store multiple versions of web pages, such as standard and mobile, and may additionally include multiple versions for devices that have pressure-sensitive displays. In one suitable implementation, web pages for devices that have pressure-sensitive displays correspond to one or more of the server pressure profiles 926. The server pressure profiles 926 are profiles that define certain characteristics that can be considered when rendering web pages to devices that have pressure-sensitive interfaces, as described in more detail below. In one suitable implementation, each server pressure profile has a corresponding web page version. This allows the proper web page to be rendered when a user of a device with a pressure-sensitive touch screen display requests a web page from the web server computer system 900.

The client pressure profiles 927 are stored by the web server mechanism 923 and preferably correspond to different devices used by different users. Each client pressure profile 927 preferably specifies information relating to a client device for a particular user. In the most preferred implementation, each client pressure profile 927 may be unique to a particular orientation, which means a user might have two different client pressure profiles 927 for a single device, the first corresponding to portrait orientation and the second corresponding to landscape orientation. The client pressure profile sharing and generation mechanism 928 allows automatically generating a client pressure profile for a client device when one of the stored client pressure profiles 927 is for a different device used by the same user. The client pressure profile sharing and generation mechanism 928 can thus automatically generate a client pressure profile from an existing client pressure profile, then may modify the newly-created client pressure profile as needed. The client pressure profile sharing and generation mechanism 928 also includes the ability to propagate changes in one client pressure profile to one or more client pressure profiles for other devices for the same user. These functions of the client pressure profile sharing and generation mechanism 928 are discussed in more detail below.

Computer system 900 utilizes well known virtual addressing mechanisms that allow the programs of computer system 900 to behave as if they only have access to a large, contiguous address space instead of access to multiple, smaller storage entities such as main memory 920 and local mass storage device 955. Therefore, while data 921, operating system 922, and web server mechanism 923 are shown to reside in main memory 920, those skilled in the art will recognize that these items are not necessarily all completely contained in main memory 920 at the same time. It should also be noted that the term "memory" is used herein generically to refer to the entire virtual memory of computer system 900, and may include the virtual memory of other computer systems coupled to computer system 900.

Processor 910 may be constructed from one or more microprocessors and/or integrated circuits. Processor 910 executes program instructions stored in main memory 920. Main memory 920 stores programs and data that processor 910 may access. When computer system 900 starts up, processor 910 initially executes the program instructions that make up operating system 922. Processor 910 also executes the web server mechanism 923 under control of the operating system 922.

Although computer system 900 is shown to contain only a single processor and a single system bus, those skilled in the art will appreciate that client pressure profile sharing and generation mechanism as described herein may be practiced using a computer system that has multiple processors and/or multiple buses. In addition, the interfaces that are used preferably each include separate, fully programmed microprocessors that are used to off-load compute-intensive processing from processor 910. However, those skilled in the art will appreciate that these functions may be performed using I/O adapters as well.

Display interface 940 is used to directly connect one or more displays 965 to computer system 900. These displays 965, which may be non-intelligent (i.e., dumb) terminals or fully programmable workstations, are used to provide system administrators and users the ability to communicate with computer system 900. Note, however, that while display interface 940 is provided to support communication with one or more displays 965, computer system 900 does not necessarily require a display 965, because all needed interaction with users and other processes may occur via network interface 950.

Network interface 950 is used to connect computer system 900 to other computer systems or workstations 975 via network 970. Computer systems 975 represent computer systems that are connected to the computer system 000 via the network interface 950 in a computer cluster. Network interface 950 broadly represents any suitable way to interconnect electronic devices, regardless of whether the network 970 comprises present-day analog and/or digital techniques or via some networking mechanism of the future. Network interface 950 preferably includes a combination of hardware and software that allows communicating on the network 970. Software in the network interface 950 preferably includes a communication manager that manages communication with other computer systems 975 via network 970 using a suitable network protocol. Many different network protocols can be used to implement a network. These protocols are specialized computer programs that allow computers to communicate across a network. TCP/IP (Transmission Control Protocol/Internet Protocol) is an example of a suitable network protocol that may be used by the communication manager within the network interface 950. In one suitable implementation, the network interface 950 is a physical Ethernet adapter.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 10:
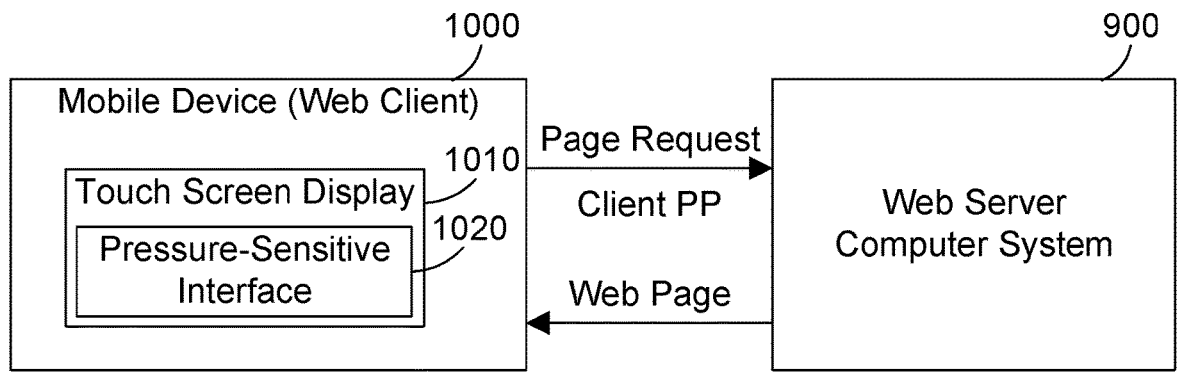
FIG. 10 is a block diagram showing interaction between a mobile device that includes a touch screen display with a pressure-sensitive interface and a web server computer system.

Referring to FIG. 10, a block diagram shows how a mobile device 1000 interacts with a web server computer system 900, such as shown in FIG. 9. Mobile device 1000 is one suitable implementation for device 100 shown in FIG. 1. The mobile device 1000 is a web client, and includes a touch screen display 1010 with a pressure-sensitive interface 1020, which correspond to the touch screen display 180 with a pressure-sensitive interface 182 shown in FIG. 1. The mobile device 1000 thus includes a pressure-sensitive touch screen display. The mobile device 1000 could be any suitable mobile device, including without limitation a smart phone, tablet computer, laptop computer, network appliance, e-reader, or any other type of electronic equipment that can request a web page from a web server. As described in the Background section above, pressure-sensitive interfaces are known in the art. However, known prior art does not automatically generate a client pressure profile for a touch screen device that includes a pressure-sensitive interface from a client pressure profile for a different device.

Figure 11:
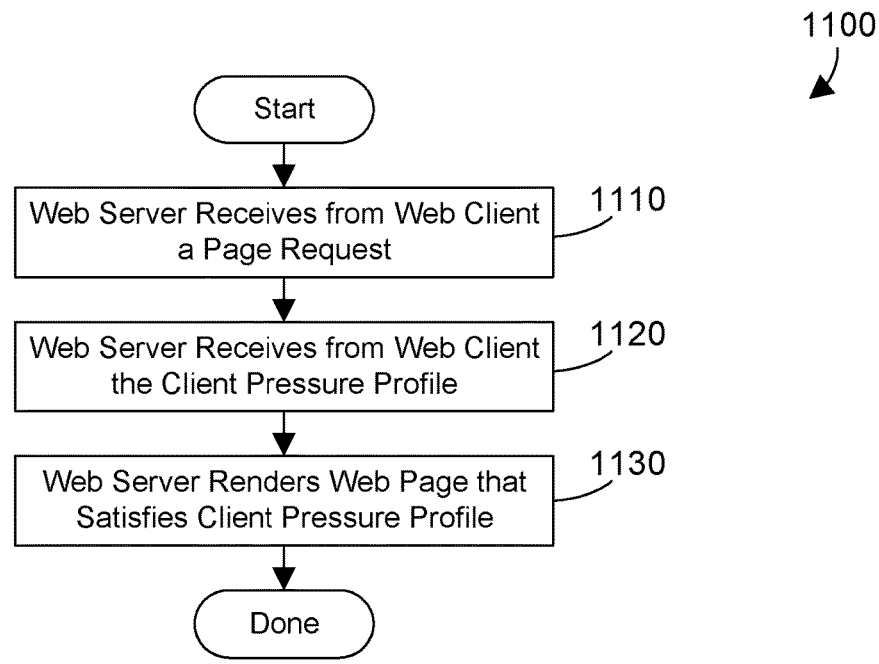
FIG. 11 is a flow diagram of a method for a web server to render a web page that satisfies a client pressure profile.

Referring to FIG. 11, a method 1100 renders web pages to devices that are web clients and that have a touch screen display with a pressure-sensitive interface, such as devices 1000 shown in FIG. 10 and device 100 shown in FIG. 1. The web server receives from the web client a page request (step 1110). The web server also receives a client pressure profile from the web client (step 1120). Note the client pressure profile in step 1120 could be sent as part of the page request to the web server in step 1110. In the alternative, the page request in step 1110 may include a simple flag or other information that identifies the requesting device as a device that has a pressure-sensitive touch screen display. When the page request is made to a web server that supports rendering different versions of a web page according to a client pressure profile, the web server could then request the client pressure profile from the device, which then sends the client pressure profile as shown in step 1120. In the alternative, instead of receiving the client pressure profile from the web client in step 1120, the web server could instead identify the user in any suitable way, and access the stored client pressure profile 927 that corresponds to the user and this device being used by the user. The web server the renders a web page that satisfies the client pressure profile (step 1130). Method 1100 is then done. The web page rendered in step 1130 is preferably a version of a web page that is better suited to the user according to the client pressure profile.

Figure 12:
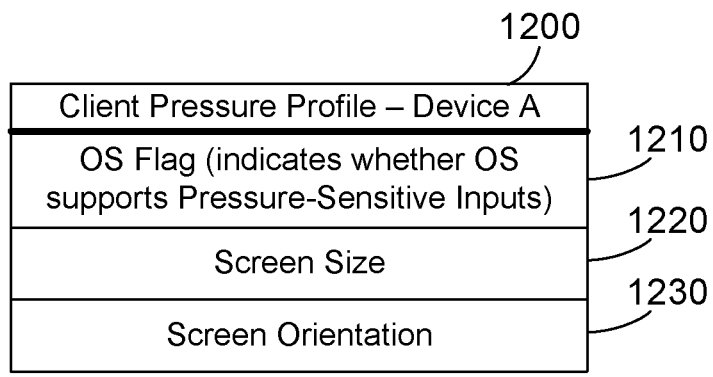
FIG. 12 is table showing first examples of information that could be included in a client pressure profile.

Referring to FIG. 12, a table shows information that could be included in the client pressure profile 1200 for a device called Device A sent in step 1120 in FIG. 11. A flag 1210 could be included that indicates whether the operating system of the requesting device supports pressure-sensitive inputs. Screen size 1220 and screen orientation 1230 may also be included in the client pressure profile. Knowing the screen size and orientation allows the web server to render a version of the web page that is optimized for pressure-sensitive input. For example, knowing the screen orientation may indicate to the web server whether the device is in a landscape orientation, and is therefore more likely being used with two thumbs, or is in a portrait orientation, and is therefore more likely being used with one thumb or one finger. In addition, knowing that the screen is large such as on a tablet computer may indicate a need to group selectable items such as pressure sensitive inputs closer to the corners of the screen than needed on a smaller screen.

Figure 13:
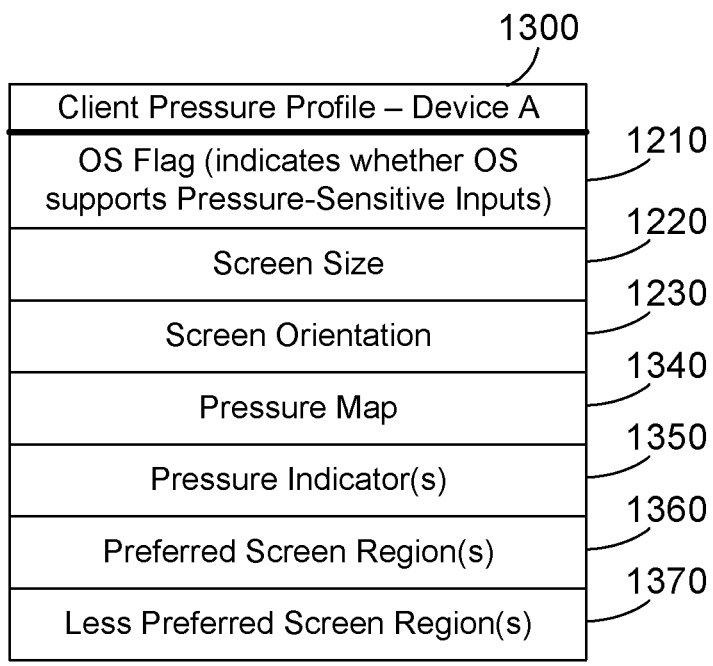
FIG. 13 is a table showing second examples of information that could be included in a client pressure profile.

Referring to FIG. 13, a second example of a client pressure profile 1300 for Device A is shown with the same information 1210, 1220 and 1230 shown in FIG. 12, but may additionally include a pressure map 1340, one or more pressure indicators 1350, one or more preferred screen regions 1360, and one or more less preferred screen regions 1370. The pressure map 1340 is preferably a map of the touch screen display of the device that is acting as a web client, and may include multiple pressure thresholds that define different actions for the device. Pressure map 1340 could be similar to the pressure map shown in FIG. 8 that includes multiple pressure thresholds for multiple different sections of the touch screen display. The client pressure profile 1300 could include one or more pressure indicators 1350 that characterize how the user uses the device. For example, a pressure indicator for a landscape orientation may be "two thumbs" while a pressure indicator for a portrait orientation may be "one thumb." A pressure indicator may also indicate the hand size of the user, and whether the user uses a right, hand, left hand, or both. In addition, the pressure indicator(s) 1350 could identify characteristics for the current orientation of the device, and would change when the orientation of the device changes. Preferred screen regions 1360 could include one or more regions of the touch screen display that are preferred for displaying selectable items, such as icons and links, which may be pressure-sensitive inputs when displayed on a pressure-sensitive touch screen display. Less preferred screen regions 1370 could include one or more regions of the touch screen display that are less preferred for displaying selectable items. In one suitable implementation, the less preferred screen regions 1370 are all regions of the touch screen display that are not in the preferred screen regions 1360. Note the information in the client pressure profile 1300 in FIG. 13 is shown as examples of information that could be included in a client pressure profile, and a client pressure profile need not include all the information shown in FIG. 13, or could include additional information. For example, the pressure map 1340 could be included in the client pressure profile 1300 without the preferred screen regions 1360 and less preferred screen regions 1370, because a web server could determine which regions of the display are preferred and less preferred from the pressure map 1340. In another example, the client pressure profile 1300 could include preferred screen regions 1360 without the pressure map 1340 and the less preferred screen regions 1370. One skilled in the art will appreciate a client pressure profile can include any suitable information relating to a user's device that can be used in determining a corresponding web page to render to the user's device.

Figure 14:
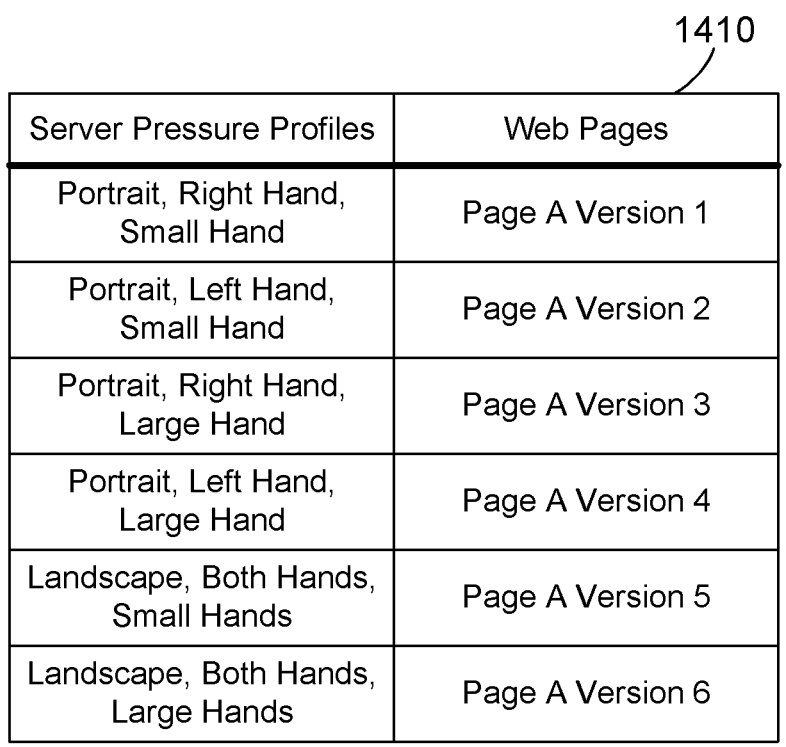
FIG. 14 is a table that shows an example of web page versions that correspond to server pressure profiles.

An example is shown in FIG. 14 to illustrate the concepts in FIGS. 11-13. Table 1410 in FIG. 14 shows the correspondence between server pressure profiles and web pages. We assume the server has the following six pressure profiles defined:

Portrait, Right Hand, Small Hand
Portrait, Left Hand, Small Hand
Portrait, Right Hand, Large Hand
Portrait, Left Hand, Large Hand
Landscape, Both Hands, Small Hands
Landscape, Both Hands, Large Hands These server pressure profiles are shown in the left column of table 1410 in FIG. 14, and correspond to server pressure profiles 926 shown in FIG. 9. Corresponding versions of the web page A are shown in the right column of table 1410 in FIG. 14. The example in FIG. 14 assumes a different version of web page A is generated and stored for each of the six server pressure profiles. When a client pressure profile is received, the web server determines which of the six server pressure profiles best corresponds to the received client pressure profile, then renders the corresponding page. In the simplest example, the information in the client pressure profile will allow an exact match with a corresponding server pressure profile. Thus, we assume the client pressure profile includes pressure indicators that identify the client pressure profile as corresponding to one of the six defined server pressure profiles in FIG. 14. In this simple case, the web server reads the client pressure profile, identifies from the information in the client pressure profile the corresponding server pressure profile, and renders the corresponding page. Thus, when the client pressure profile specifies "Landscape, both hands, small hands", the web server identifies the corresponding server pressure profile, and from FIG. 14 knows to render Page A Version 5. In other implementations, there may not be information in the client pressure profile that directly identifies a corresponding server pressure profile, and the web server may have to do some additional work to determine the correspondence between the client pressure profile and the corresponding server pressure profile.

Figure 15:
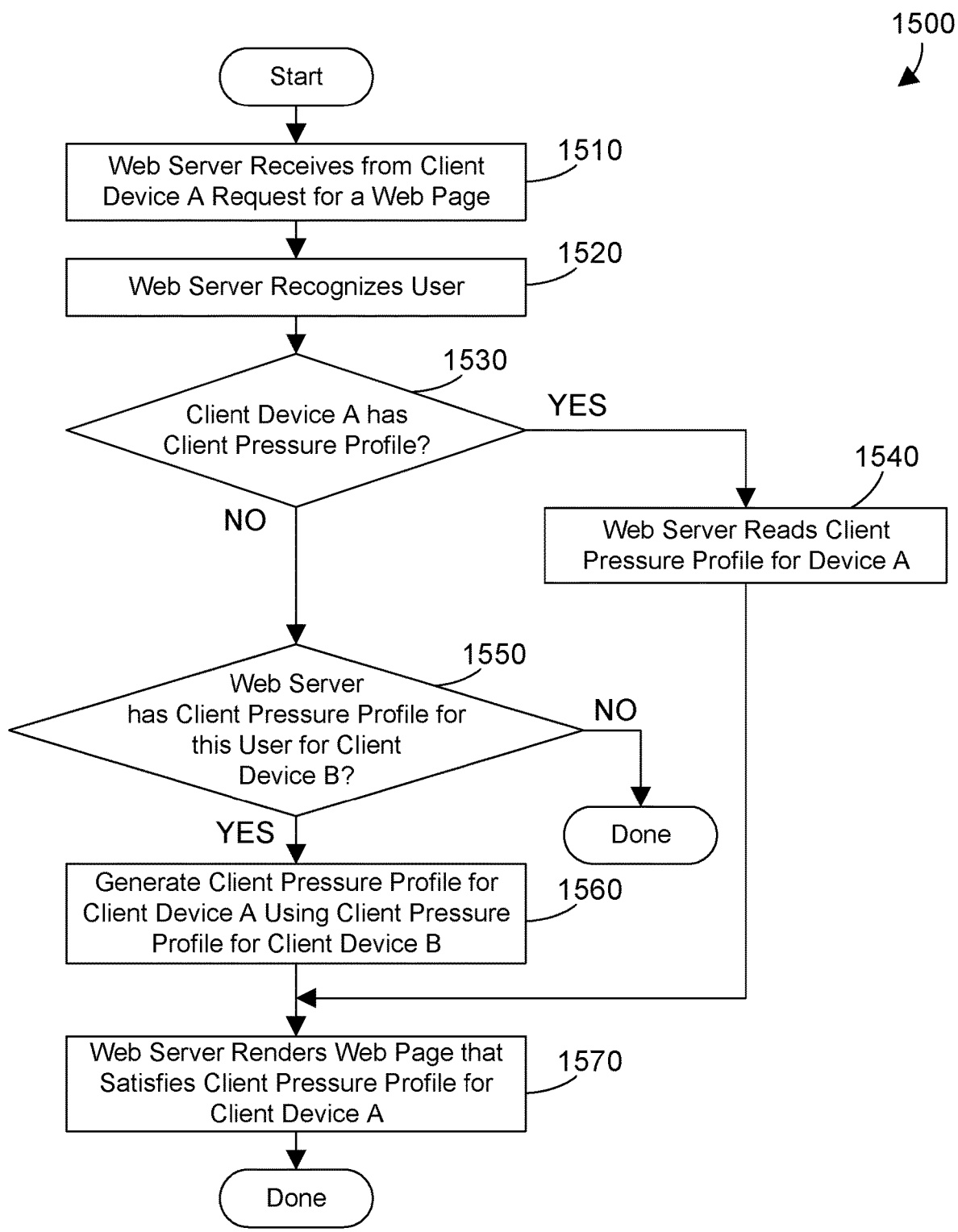
FIG. 15 is a flow diagram of a method for automatically generating a client pressure profile for a device based on the client pressure profile for a different device.

Referring to FIG. 15, a method 1500 is preferably performed by the web server mechanism 923 in FIG. 9, with portions of method 1500 being performed by the client pressure profile sharing and generation mechanism 928. The web server receives from a client device A a request for a web page (step 1510). The web server recognizes the user (step 1520). The web server can recognize the server in step 1520 in any suitable way. One suitable way for the web server to recognize the user is to provide a login screen to the user, and receive a username and password from the user that authenticates the user to the web server. Another suitable way for the web server to recognize the user is for the client device to send with the page request in step 1510 an identifier that allows the web server to identify the user. Another suitable way for the web server to recognize the user is for the web server to interact with a cookie or other software on the client device to receive information from the client device that identifies the user. Any suitable method for allowing the web server to recognize the user can be used in step 1520. Once the user is recognized in step 1520, the web server determines whether the client device A has a stored client pressure profile (step 1530). In one suitable implementation, the web server stores client pressure profiles 927 shown in FIG. 9 for each user device that includes a pressure-sensitive interface. The web server can then recognize the client device in step 1510, recognize the user in step 1520, and determine whether the stored client pressure profiles 927 include a client pressure profile for Device A. When the client Device A has a stored client pressure profile on the web server (step 1530=YES), the web server reads the client pressure profile for Device A (step 1540), and the web server renders a web page that satisfies the client pressure profile for client Device A (step 1570). When the client Device A does not have a stored client pressure profile (step 1530=NO), the web server determines if it has a client pressure profile for this user for a different client Device B (step 1550). If not (step 1550=NO), method 1500 is done, and the client pressure profile for client Device B will have to be generated in some other fashion, such as using method 300 in FIG. 3 or method 500 in FIG. 5. When the web server does not have a stored client pressure profile for client Device A (step 1530) but has a client pressure profile for this user for a different Device B (step 1550=YES), the client pressure profile for client Device A is automatically generated using the client pressure profile for client Device B (step 1560). The web server then renders a web page that satisfies the newly-generated client pressure profile for client Device A (step 1570), and method 1500 is done. Note that steps 1550 and 1560 are preferably performed by the client pressure profile sharing and generation mechanism 928 shown in FIG. 9.

An advantage of method 1500 over the methods 300 shown in FIGS. 3 and 500 shown in FIG. 5 is a client pressure profile may be automatically generated for the user based on an existing client pressure profile for one of the user's other devices, without the need of the detailed calibration method 300 shown in FIG. 3. Note the automatically-generated client pressure profile can be a starting point the user may customize as needed. For example, let's assume a user is using an iPhone, and the web server has a first stored client pressure profile for the user's iPhone in portrait orientation, and a second stored client pressure profile for the user's iPhone in landscape orientation. Now let's assume the user gets a new Android phone. The web server receives a request for a web page from the user's new Android phone (step 1510). The web server recognizes the user (step 1520), such as when the user logs in to the web server. The new Android phone does not have a stored client pressure profile (step 1530=NO), but the web server has a client pressure profile for this user's iPhone (step 1550=YES), so the client pressure profile for the new Android phone can be automatically generated using the client pressure profile for the user's iPhone (step 1560). Once the client pressure profile for the new Android phone is automatically generated in step 1560, the web server renders a web page that satisfies the newly-generated pressure profile for the Android phone (step 1570).

Figure 16:
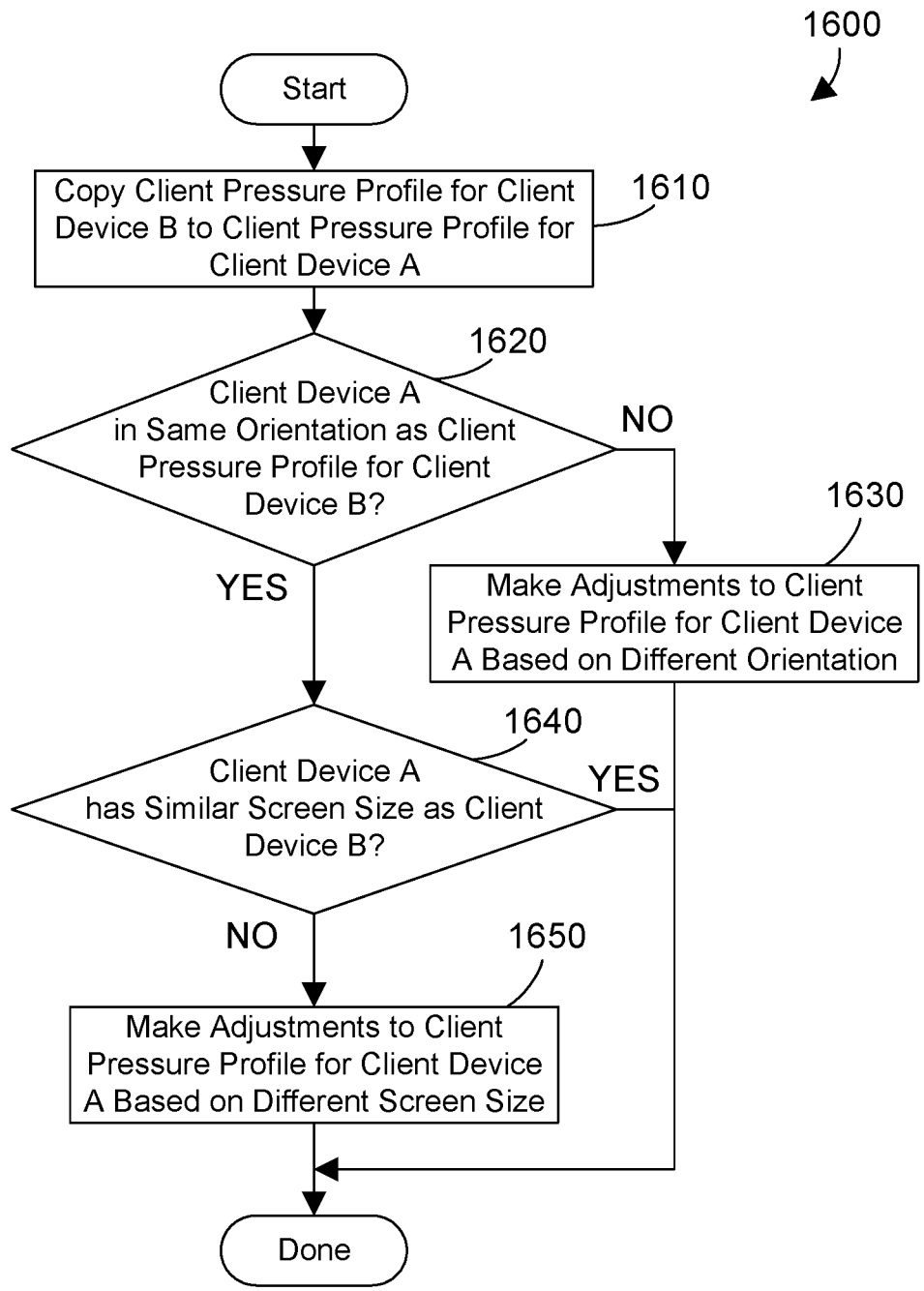
FIG. 16 is a flow diagram of one suitable method for performing step 1560 in FIG. 15.

Referring to FIG. 16, a method 1600 is one suitable implementation for step 1560 in FIG. 15. The client pressure profile for client Device B is copied to a client pressure profile for client Device A (step 1610). When the client Device A is in a different orientation as the client pressure profile for client Device B (step 1620=NO), adjustments may be automatically made to the client pressure profile for client Device A based on the different orientation (step 1630). When the client device A is in the same orientation as the client pressure profile for client Device B (step 1620=YES), and when the client Device A has a different screen size as client Device B (step 1640=NO), adjustments may be automatically made to the client pressure profile for client device A based on the different screen size (step 1650).

When client device A is in the same orientation as the client pressure profile for client device B (step 1620=YES) and client Device A has a screen size similar to client device B (step 1640=YES), method 1600 is done. Method 1600 illustrates how a client pressure profile for a different device can be used as a starting point, then can be automatically adjusted to account for differences in orientation or screen size.

Let's assume client Device A is in portrait orientation, but the client pressure profile for Device B is for landscape orientation. One suitable example of adjustments in step 1640 is to move selectable items on the web page so they are more easily selected in the different orientation. In another example, let's assume client Device A has a screen size twice as big as client Device B. Suitable adjustments in step 1650 could include enlarging selectable items, moving selectable items closer to an edge, applying pressure thresholds in Device B to much larger regions in Device A, etc. Any suitable adjustments could be made in steps 1630 and 1650 within the scope of the disclosure and claims herein.

Figure 17:
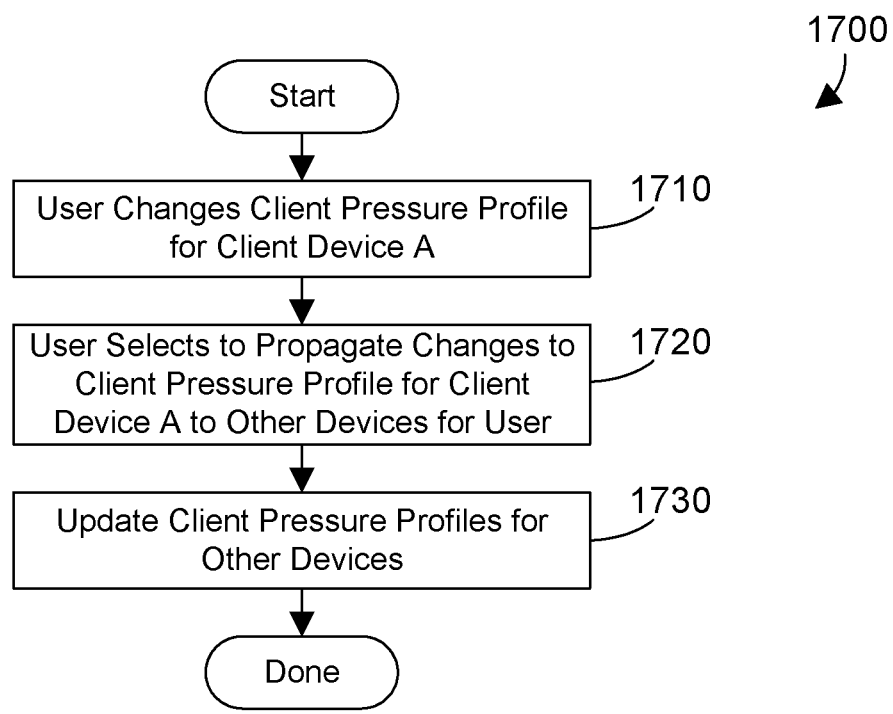
FIG. 17 is a flow diagram of a method for automatically propagating a user change to a client pressure profile on one device to the client pressure profile of one or more different devices.

The client pressure profile sharing and generation mechanism 928 shown in FIG. 9 can also be used to propagate changes to the client pressure profile for one of the user's device to one or more client pressure profiles for other user devices. Referring to FIG. 17, method 1700 determines when a user changes a client pressure profile for Device A (step 1710). The user selects to propagate changes to the client pressure profile for client Device A to the client pressure profiles for other devices for this user (step 1720). In response to the user selecting to propagate the changes in step 1720, one or more client pressure profiles for other devices for this user are updated (step 1730). Method 1700 is then done. Method 1700 illustrates how a user can make a change on one device, then automatically propagate this change to the client pressure profiles of other devices. This could be useful, for example, if the user injured a thumb and is unable to use the thumb as usual in selecting items on the pressure-sensitive touch screen display. The user could change the pressure profile on one device to account for the injured thumb, then propagate those changes to other client pressure profiles for other devices the user may use. The propagated changes thus allow web pages that are customized to allow easy selection of selectable items without the user using the injured thumb.

A web server includes a client pressure profile sharing and generation mechanism that detects when a user accesses the web server with a first device that does not have a client pressure profile, and automatically generates a client pressure profile for the first device from a client pressure profile for a second device used by the user. Adjustments may be automatically made to the client pressure profile for the first device based on differences in orientation and based on differences in screen size. Changes by the user to the client pressure profile for the first device can be automatically propagated to client pressure profiles for other devices used by the user.

One skilled in the art will appreciate that many variations are possible within the scope of the claims. Thus, while the disclosure is particularly shown and described above, it will be understood by those skilled in the art that these and other changes in form and details may be made therein without departing from the spirit and scope of the claims.

The invention claimed is:

1. A computer system comprising:
at least one processor;
a memory coupled to the at least one processor;
a plurality of client pressure profiles residing in the memory, each client pressure profile indicating for a specified user information regarding a different client device used by the specified user; and
a web server mechanism residing in the memory and executed by the at least one processor, the web server mechanism rendering a plurality of web pages to client devices that each includes a pressure-sensitive interface that is capable of detecting a plurality of pressures when a user touches a displayed pressure-sensitive input on a touch screen display on the client device and interpreting each of the plurality of pressures as a different action with respect to the displayed pressure-sensitive input, wherein the web server mechanism receives a request for a requested web page from a selected client device used by a first user, determines the selected client device used by the first user does not have a corresponding client pressure profile stored in the plurality of client pressure profiles, determines a first of the plurality of client pressure profiles corresponds to a second client device used by the specified user, and in response, automatically generates without further input from the specified user a new client pressure profile for the selected client device from the first client pressure profile, wherein the new client pressure profile is stored as one of the plurality of client pressure profiles, wherein the web server mechanism receives a change to a second of the plurality of the client pressure profiles, receives an indication the user wants to propagate the change to at least one other client pressure profile corresponding to the user for at least one other device used by the user, and, in response, updates the first client pressure profile with the change.

2. The computer system of claim 1 wherein each of the plurality of client pressure profiles comprises an indication of whether an operating system on the client device supports pressure-sensitive inputs.

3. The computer system of claim 1 wherein each of the plurality of client pressure profiles comprises a screen size and a current screen orientation.

4. The computer system of claim 1 wherein each of the plurality of client pressure profiles comprises a pressure map that includes a plurality of pressure thresholds for each of a plurality of sections of the touch screen display.

5. The computer system of claim 1 wherein the web server mechanism makes at least one adjustment to the new client pressure profile for the selected client device based on a different orientation for the selected client device when compared to orientation for the first client pressure profile.

6. The computer system of claim 1 wherein the web server mechanism makes at least one adjustment to the new client pressure profile for the selected client device based on a different screen size for the selected client device when compared to screen size for the first client pressure profile.

7. A method for a web server computer system to render web pages to an electronic device that includes a pressure-sensitive interface on a touch screen display, the method comprising:
storing a plurality of client pressure profiles, each client pressure profile indicating for a specified user information regarding a different client device used by the specified user;

rendering a plurality of web pages to client devices that each includes a pressure-sensitive interface that is capable of detecting a plurality of pressures when a user touches a displayed pressure-sensitive input on a touch screen display on the client device and interpreting each of the plurality of pressures as a different action with respect to the displayed pressure-sensitive input;

receiving a request for a requested web page from a selected client device used by a first user;

determining the selected client device used by the first user does not have a corresponding client pressure profile stored in the plurality of client pressure profiles;

determining a first of the plurality of client pressure profiles corresponds to a second client device used by the specified user, and in response, automatically generating without further input from the specified user a new client pressure profile for the selected client device from the first client pressure profile, wherein the new client pressure profile is stored as one of the plurality of client pressure profiles;

receiving a change to a second of the plurality of the client pressure profiles;

receiving an indication the user wants to propagate the change to at least one other client pressure profile corresponding to the user for at least one other device used by the user; and in response, updating the first client pressure profile with the change.

8. The method of claim 7 wherein each of the plurality of client pressure profiles comprises an indication of whether an operating system on the client device supports pressure-sensitive inputs.

9. The method of claim 7 wherein each of the plurality of client pressure profiles comprises a screen size and a current screen orientation.

10. The method of claim 7 wherein each of the plurality of client pressure profiles comprises a pressure map that includes a plurality of pressure thresholds for each of a plurality of sections of the touch screen display.

11. The method of claim 7 further comprising making at least one adjustment to the new client pressure profile for the selected client device based on a different orientation for the selected client device when compared to orientation for the first client pressure profile.

12. The method of claim 7 further comprising making at least one adjustment to the new client pressure profile for the selected client device based on a different screen size for the selected client device when compared to screen size for the first client pressure profile.

13. A method for a web server computer system to render web pages to an electronic device that includes a pressure-sensitive interface on a touch screen display, the method comprising:

storing a plurality of client pressure profiles, each client pressure profile indicating for a specified user information regarding a different client device used by the specified user, wherein each of the plurality of client pressure profiles comprises:
 an indication of whether an operating system on the client device supports pressure-sensitive inputs;
 a screen size and a current screen orientation;
 a pressure map that includes a plurality of pressure thresholds for each of a plurality of sections of the touch screen display;

rendering a plurality of web pages to client devices that each includes a pressure-sensitive interface that is capable of detecting a plurality of pressures when a user touches a displayed pressure-sensitive input on a touch screen display on the client device and interpreting each of the plurality of pressures as a different action with respect to the displayed pressure-sensitive input;

receiving a request for a requested web page from a selected client device used by a first user;

determining the selected client device used by the first user does not have a corresponding client pressure profile stored in the plurality of client pressure profiles;

determining a first of the plurality of client pressure profiles corresponds to a second client device used by the specified user, and in response, automatically generating without further input from the specified user a new client pressure profile for the selected client device from the first client pressure profile;

making at least one adjustment to the new client pressure profile for the selected client device based on a different orientation for the selected client device when compared to orientation for the first client pressure profile;

making at least one adjustment to the new client pressure profile for the selected client device based on a different screen size for the selected client device when compared to screen size for the first client pressure profile;

receiving a change to a second of the plurality of the client pressure profiles;

receiving an indication the user wants to propagate the change to at least one other client pressure profile corresponding to the user for at least one other device used by the user; and in response, updating the first client pressure profile with the change.

* * * * *